United States Patent
Tanaka et al.

(10) Patent No.: US 6,863,994 B2
(45) Date of Patent: Mar. 8, 2005

(54) SLIDING BEARING AND METHOD OF MANUFACTURING THE SAME

(75) Inventors: Takuya Tanaka, Aichi (JP); Nobutaka Hiramatsu, Aichi (JP); Takayuki Shibayama, Aichi (JP)

(73) Assignee: Daido Metal Company Ltd., Nagoya (JP)

( * ) Notice: Subject to any disclaimer, the term of this patent is extended or adjusted under 35 U.S.C. 154(b) by 0 days.

(21) Appl. No.: 10/076,417

(22) Filed: Feb. 19, 2002

(65) Prior Publication Data

US 2002/0155304 A1 Oct. 24, 2002

(30) Foreign Application Priority Data

Feb. 19, 2001 (JP) ........................................ 2001-041730

(51) Int. Cl.[7] ............................................. B32B 15/08
(52) U.S. Cl. ...................... 428/626; 428/457; 428/458; 428/624; 384/276; 384/907
(58) Field of Search ................................. 428/624, 626, 428/457, 458, 328, 331; 384/276, 907; 427/385.5, 407.1

(56) References Cited

U.S. PATENT DOCUMENTS

| 3,652,408 A | 3/1972 | Korshak et al. ............ 252/12 |
| 4,462,144 A | * 7/1984 | White .................... 29/898.055 |
| 5,137,985 A | * 8/1992 | Chen et al. .................. 525/431 |
| 5,391,605 A | * 2/1995 | Andres et al. ............... 524/404 |
| 5,525,246 A | 6/1996 | Kamiya et al. ................ 252/12 |
| 6,569,816 B2 | * 5/2003 | Oohira et al. ................ 508/107 |

FOREIGN PATENT DOCUMENTS

| GB | 1 337 995 | 11/1973 |
| GB | 1 415 100 | 11/1975 |
| GB | 2 345 095 A | 6/2000 |

* cited by examiner

Primary Examiner—Monique R. Jackson
(74) Attorney, Agent, or Firm—Browdy and Neimark, P.L.L.C.

(57) ABSTRACT

A sliding bearing includes a bearing alloy layer having a sliding surface and a resin surface layer formed on the sliding surface of the bearing alloy layer and containing polybenzimidazole and a solid lubricant. In manufacturing the sliding bearing, a resin surface layer composition is applied to a roughened surface of a bearing alloy layer. The resin surface layer composition contains polybenzimidazole and a solid lubricant. The resin surface layer composition is heated so as to be hardened to be formed into a resin surface layer.

9 Claims, 3 Drawing Sheets

FIG. 3A

COMPOSITION OF BEARING (VOLUME %)

| | | Bearing Alloy | Bonding Layer | | | | | Resin Surface Layer | | | | | | | |
|---|---|---|---|---|---|---|---|---|---|---|---|---|---|---|---|
| | | | Base Resin | | Solid Lubricant | | | Base Resin | | | Solid Lubricant | | | Other Additive | |
| | | | PAI | PI | MoS₂ | Gr | PTFE | PAI | EP | PBI | MoS₂ | Gr | PTFE | Cu | Si₃N₄ |
| Example | 1 | Cu | | | | | | | | 20 | 80 | | | | |
| | 2 | Cu | | | | | | | | 60 | 40 | | | | |
| | 3 | Cu | | | | | | | | 30 | 70 | | | | |
| | 4 | Cu | | | | | | | | 57 | 40 | | | 3 | |
| | 5 | Cu | | | | | | | | 54 | 40 | | 20 | 3 | 3 |
| | 6 | Cu | | | | | | | | 39 | 40 | | | 1 | |
| | 7 | Cu | 100 | | | | | | | 60 | 40 | | | | |
| | 8 | Cu | 100 | | | | | | | 30 | 70 | | | | |
| | 9 | Cu | | 100 | | | | | | 39 | 40 | | 20 | 1 | |
| | 10 | Cu | 60 | | 40 | | | | | 60 | 40 | | | | |
| | 11 | Cu | 60 | | | 40 | | | | 60 | 40 | | | | |
| | 12 | Cu | 60 | | | | 40 | | | 80 | 20 | | | | |
| Comparative Example | 13 | Cu | | | | | | 100 | | | | | | | |
| | 14 | Cu | | | | | | | 100 | | | | | | |
| | 15 | Cu | | | | | | 60 | | | 40 | | | | |
| | 16 | Cu | | | | | | 30 | | | 70 | | | | |
| | 17 | Cu | | | | | | 57 | | | 40 | | | 3 | |
| | 18 | Cu | | | | | | 57 | | | | 40 | | 3 | |
| | 19 | Cu | | | | | | 54 | | | 40 | | | 3 | |
| | 20 | Cu | | | | | | 39 | | | 40 | | 20 | 1 | 3 |
| | 21 | Cu | | | | | | | | 100 | | | | | |

| | COEFFICIENT OF FRICTION | RESULTS OF TEST | | |
|---|---|---|---|---|
| | | AMOUNT OF WEAR (μm) | SEIZURE LOAD (MPa) | VOLUMETRIC DECREASE (mm³) |
| EXAMPLE 1 | 0.03 | 15 | 21 | 5.30 |
| 2 | 0.05 | 8 | 24 | 3.46 |
| 3 | 0.03 | 9 | 27 | 4.80 |
| 4 | 0.04 | 4 | 27 | 3.54 |
| 5 | 0.04 | 1 | 30 | 4.56 |
| 6 | 0.03 | 4 | 30 | 4.29 |
| 7 | 0.05 | 8 | 27 | 2.74 |
| 8 | 0.03 | 9 | 27 | 4.26 |
| 9 | 0.03 | 4 | 30 | 3.65 |
| 10 | 0.05 | 8 | 33 | 1.96 |
| 11 | 0.05 | 7 | 33 | 2.08 |
| 12 | 0.05 | 8 | 33 | 2.76 |
| 13 | 0.10 | 12 | 15 | 5.76 |
| 14 | 0.10 | 13 | 15 | 5.69 |
| 15 | 0.05 | 17 | 21 | 3.56 |
| 16 | 0.03 | 20 | 24 | 6.00 |
| COMPARATIVE EXAMPLE 17 | 0.05 | 6 | 24 | 4.21 |
| 18 | 0.05 | 6 | 24 | 4.76 |
| 19 | 0.04 | 2 | 24 | 5.90 |
| 20 | 0.04 | 7 | 27 | 5.01 |
| 21 | 0.12 | 10 | 15 | 4.89 |

FIG. 3B

SLIDING BEARING AND METHOD OF MANUFACTURING THE SAME

BACKGROUND OF THE INVENTION

1. Field of the Invention

This invention relates to a sliding bearing having a resin surface layer formed on a sliding surface of a bearing alloy layer and containing a resin and a solid lubricant, and a method of manufacturing the sliding bearing.

2. Description of the Related Art

A sliding bearing has conventionally been used for internal combustion engines of automobiles or the like. The conventional sliding bearing includes a Cu or Al bearing alloy bonded onto a back steel. In order that a wear resistance, anti-seizure property and initial conformability may be improved, the conventional sliding bearing of the aforementioned type includes a resin surface layer formed on the surface of a bearing alloy layer so as to cover the latter layer. The resin surface layer contains a thermosetting resin such as polyamide-imide (PAI), polyimide (PI) or epoxy (EP) resin, and a solid lubricant. For example, JP-A-4-83914 and JP-A-9-79262 each disclose such improvement.

Recently, owing to the high power and high speed of internal combustion engines, the sliding bearings have become used under severer conditions. However, the conventional sliding bearing covered with the resin overlay has been found difficult to meet the requirement. Accordingly, sliding bearings having a higher quality have been desired.

SUMMARY OF THE INVENTION

Therefore, an object of the present invention is to provide a sliding bearing which can improve the wear resistance, anti-seizure property, initial conformability and anti-cavitation property in order that the sliding bearing may cope with more severe conditions.

Another object of the invention is to provide a method of manufacturing the foregoing sliding bearing desirably.

In one aspect, the present invention provides a sliding bearing comprising a bearing alloy layer having a sliding surface and a resin surface layer provided on the sliding surface of the bearing alloy layer and containing polybenzimidazole (hereinafter referred to as "PBI") and a solid lubricant.

TABLE 1 shows physical properties of PBI serving as a base resin of the resin surface layer. PBI, which is a thermoplastic resin, has a higher heat resistance and material strength than the conventionally used thermosetting resins such as PAI, PI, and EP. Accordingly, the wear resistance and anti-seizure property of the sliding bearing can be improved. Furthermore, the material strength of the sliding bearing is prevented from being decreased in a high-temperature atmosphere or due to generation of heat during sliding. Accordingly, a high wear resistance of the sliding bearing can be maintained even in the high-temperature atmosphere or during sliding. Further, the initial conformability of the sliding bearing can be improved since the PBI resin is allowed to elongate. Additionally, since the resin surface layer contains the solid lubricant, the friction property and the anti-seizure property of the sliding bearing can further be improved.

TABLE 1

|  | PBI resin (polybenzimidazole) | PI resin |
|---|---|---|
| Tensile strength (MPa) | 127 | 90 to 120 |
| Elongation (%) | 30 | 8 to 23 |
| Thermal deformation temperature (° C.) | 427 | 272 |

In a first preferred form, the sliding bearing further comprises a bonding layer provided on the sliding surface of the bearing alloy layer, which comprises a thermosetting resin. In this case, the resin surface layer is formed on the bonding layer. Consequently, the wear resistance, anti-seizure property and initial conformability of the sliding bearing can be improved as in the foregoing construction. Furthermore, since the thermosetting resin with a high bond strength is sandwiched between the bearing alloy layer and the resin surface layer as the bonding layer, a bond strength of the resin surface layer against the bearing alloy layer can further be improved, whereupon peeling of the resin surface layer can be prevented. PAI, PI, EP or phenol resin is preferred as the thermosetting resin.

During use of the sliding bearing, a high-speed shear in a lubricant, an obstacle in a lubricant path or the like sometimes produces cavities (or bubbles). The cavities are produced in a low pressure part of the lubricant and disappear in a high pressure part of the lubricant alternately repeatedly, whereupon an erosion occurs on the bearing surface. More specifically, when bubbles produced in the lubricant are collapsed repeatedly under a high pressure, energy due to the collapse erosionally wears the bearing surface.

As a countermeasure, the material strength of the resin surface layer is conventionally improved for prevention of erosion. Furthermore, when a bond strength between the bearing alloy layer and the resin surface layer is lower than the material strength of the resin surface layer, subjection to a high-pressure slight vibration results in peeling in a boundary between the bearing alloy layer and the resin surface layer but does not erosionally wear the bearing surface. The bearing alloy surface has conventionally been treated to be roughened for improvement in the bond strength between the bearing alloy and the resin surface layer. However, the surface treatment has been found unsatisfactory and another countermeasure has been desired. When the bonding layer comprising a thermosetting resin is provided on the sliding surface of the bearing alloy layer, the bond strength between the bearing alloy layer and the resin surface layer can further be improved and accordingly, the bearing surface can further be prevented from erosion.

In a second preferred form, the resin surface layer further contains hard particles and a soft metal. Addition of the hard particles can further improve the wear resistance. More specifically, the hard particles may be a nitride such as silicon nitride, an oxide such as aluminum oxide, silicon oxide or titanium oxide, or a carbide such as silicon carbide. Additionally, addition of the soft metal can improve the wear resistance and anti-seizure property by high heat dissipation. More specifically, the soft metal may be copper, silver, gold, aluminum, tin, zinc or alloys of these metals. Among the soft metal particles, easily sulfurizable metal particles react with sulfur contained in the lubricant thereby to form a thin sulfide film excellent in lubricity on a particle surface. Consequently, a coefficient of friction can further be made smaller.

In a third preferred form, the bonding layer contains a solid lubricant. Consequently, since effects of the solid lubricant are expected as well as those of the resin surface layer, a sudden drop in a sliding characteristic can be prevented even if the resin surface layer wears out.

In a fourth preferred form, the bearing alloy layer comprises a copper alloy or an aluminum alloy.

In another aspect, the invention provides a method of manufacturing a sliding bearing comprising the steps of applying a resin surface layer composition to a roughened surface of a bearing alloy layer, the resin surface layer composition containing PBI and a solid lubricant and heating the resin surface layer composition so that the resin surface layer composition is hardened thereby to be formed into a resin surface layer. Consequently, the resin surface layer can be formed desirably.

The invention further provides a method of manufacturing a sliding bearing comprising the steps of applying a bonding layer material to a roughened surface of a bearing alloy layer and applying heat to the bonding layer material so that the bonding layer material is hardened into a bonding layer, applying a resin surface layer composition to a surface of the bonding layer after the step of hardening the bonding layer material, the resin surface layer composition containing PBI and a solid lubricant, and heating the resin surface layer composition so that the resin surface layer composition is hardened thereby to be formed into a resin surface layer. Consequently, the bond strength can further be improved between the bearing alloy layer and the resin surface layer.

BRIEF DESCRIPTION OF THE DRAWINGS

Other objects, features and advantages of the present invention will become clear upon reviewing the following description of a preferred embodiment, made with reference to the accompanying drawings, in which:

FIGS. 3A and 3B show bearing composition of examples of the invention and comparative examples and test results.

DETAILED DESCRIPTION OF PREFERRED EMBODIMENTS

Figure 1:
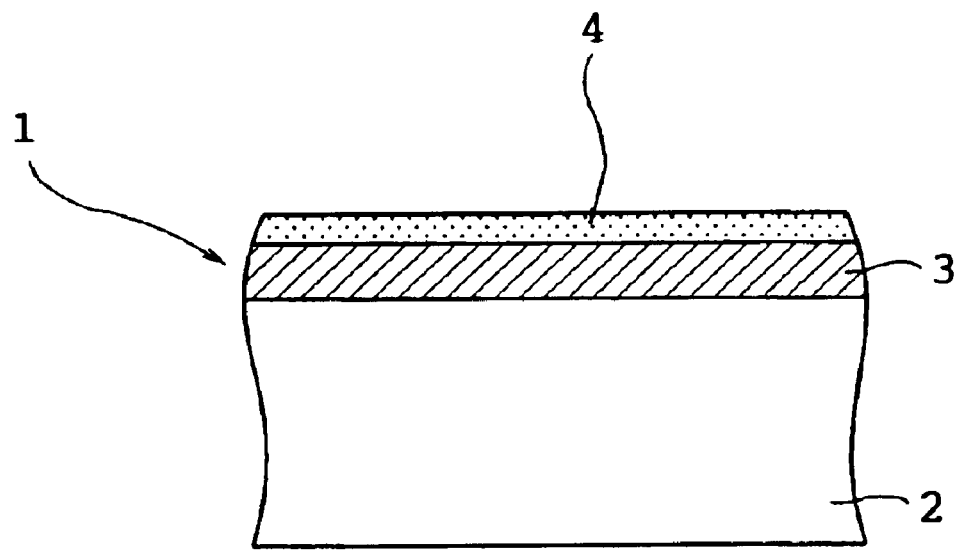
FIG. 1 is a sectional view of a sliding bearing of each of first to sixth examples in accordance with the present invention.

In the present invention, a resin surface layer refers to a coat containing PBI serving as a base resin and a solid lubricant and has a thickness ranging 1 to 50 μm, preferably ranging 3 to 20 μm. The solid lubricant may contain molybdenum disulfide ($MoS_2$), graphite (Gr), polytetrafluoroethylene (PTFE), tungsten disulfide ($WS_2$), boron nitride (BN) or the like. Further, the resin surface layer may contain hard particles, soft metals or the like if necessary. The hard particles may contain a nitride such as silicon nitride ($Si_3N_4$), an oxide such as aluminum oxide ($Al_2O_3$), silicon oxide ($SiO_2$) or titanium oxide ($TiO_2$), a carbide such as silicon carbide (SiC) or the like. The soft metal may contain copper, silver, gold, aluminum, tin, zinc or alloys of these metals.

A bearing alloy layer is bonded to a steel plate serving as a backing metal. The plate is then formed into a predetermined shape of sliding bearing and degreased. Successively a surface of the bearing alloy layer is treated to be roughened. Acid washing is further carried out so that impurities adherent to the surface are eliminated and the surface of the bearing alloy layer is activated.

After hot water washing and drying, a resin surface layer composition diluted with a suitable organic solvent, namely, a mixture comprising PBI serving as a base resin, $MoS_2$ as a solid lubricant, and an additive such as $Si_3N_4$ is applied to the surface of the bearing alloy layer by an air spray so as to have a thickness ranging 1 to 50 μm to be dried and cured at a temperature ranging between 300° C. and 400° C. As the result of curing, the solvent is vaporized, and the resin surface layer containing PBI and solid lubricant is hardened to be formed on a bearing alloy layer.

Alternatively, the sliding bearing is manufactured in the following method. Only the differences from the foregoing method will be described. A bonding layer comprising a thermosetting resin is provided between the bearing alloy layer and the resin surface layer. More specifically, the resin surface layer is provided on the bonding layer which is further provided on the surface of the bearing alloy layer. The bonding layer is a coat comprising the thermosetting resin and has a thickness which is at or below 5 μm, preferably at or below 2 μm. The solid lubricant and additive may be selected from those described above.

A bearing alloy layer is bonded to a steel plate serving as a backing metal, and the plate is then formed into a predetermined shape of sliding bearing and degreased, in the same manner as described above. Successively a surface of the bearing alloy layer is treated to be roughened. Acid washing is further carried out so that impurities adherent to the surface are eliminated and the surface of the bearing alloy layer is activated.

After hot water washing and drying, a bonding layer composition diluted with a suitable organic solvent, namely, a mixture comprising PAI serving as a base resin, $MoS_2$ as a solid lubricant, and an additive such as $Si_3N_4$ is applied to the surface of the bearing alloy layer by an air spray so as to have a thickness which is at or below 5 μm to be dried and cured at a temperature between 200° C. and 250° C. As the result of curing, the solvent is vaporized, and the bonding layer containing PAI and solid lubricant is hardened to be formed on a bearing alloy layer.

Furthermore, the same resin surface layer composition as in the foregoing sliding bearing is applied to the surface of the bonding layer by the air spray so as to have a thickness ranging 1 to 50 μm to be dried and cured at a temperature between 300° C. and 400° C. The solvent is vaporized as the result of curing, and the resin surface layer containing PBI and solid lubricant is hardened to be formed on a bearing alloy layer.

The resin surface layer composition contains 20 to 95% PBI resin by volume and 5 to 80% solid lubricant by volume. Further, less than 5% hard particles by volume and less than 10% soft metal by volume can be added in total of the resin surface layer composition. When an amount of PBI resin is smaller than 20% by volume, retention of the solid lubricant in the resin surface layer is reduced such that an amount of wear is increased. When an amount of PBI resin is larger than 95% by volume, the friction coefficient is increased such that the anti-seizure property is reduced. Furthermore, when an amount of solid lubricant is smaller than 5% by volume, a sufficient sliding effect cannot be achieved. When an amount of solid lubricant is larger than 70% by volume, the bond strength between the bearing alloy layer and the resin surface layer is low such that wear and peeling occur. Additionally, when an amount of hard particles is larger than 5% by volume, a shaft to be supported by the bearing is damaged such that the friction coefficient is increased and the anti-seizure property is reduced. When an amount of soft metal is larger than 10% by volume, coating becomes difficult.

Based on examples of the invention and comparative examples, the invention will be described in detail.

EXAMPLES 1 to 6 AND COMPARATIVE EXAMPLES 13 to 21

A bearing alloy layer of Cu system was bonded to a steel plate serving as a backing metal. The plate was then formed into a flat shape of the sample as shown in TABLES 2 to 4 and degreased. A surface of the bearing alloy layer was roughened by shot blasting. After acid washing, hot water washing and drying, resin surface layer compositions as shown as examples 1 to 6 and comparative examples 13 to 21 in FIG. 3 were diluted with an organic solvent (N-dimethyl-2-pyrrolidone), and the resultant liquids were sprayed on the surfaces of the bearing alloy layers by an air spray. Thereafter, the examples 1 to 6 and the comparative example 21 were heated at 350° C. for 60 minutes and hardened, whereas the comparative examples 13 to 20 were heated at 250° C. for 60 minutes and hardened. The resin surface layer for each of the frictional wear test and cavitation test had a thickness of 20 µm, and the resin surface layer for the seizure test had a thickness of 5 µm.

EXAMPLES 7 to 12

A bearing alloy layer of Cu system was bonded to a steel plate serving as a backing metal. The plate was then formed into a flat shape as shown in TABLES 2 to 4 and degreased. A surface of the bearing alloy layer was roughened by shot blasting. After acid washing, hot water washing and drying, bonding layer compositions as shown as examples 7 to 12 in FIG. 3 were sprayed on the surfaces of the bearing alloy layers by an air spray so that a thickness of 2 µm was obtained. Furthermore, the resin surface layer compositions were diluted with an organic solvent (N-dimethyl-2-pyrrolidone), and the resultant liquids were sprayed on the surfaces of the bonding layers by the air spray. Thereafter, the examples were heated at 350° C. for 60 minutes and hardened. The resin surface layer for each of the frictional wear test and cavitation test had a thickness of 18 µm, and the resin surface layer for the seizure test had a thickness of 3 µm.

Figure 2:
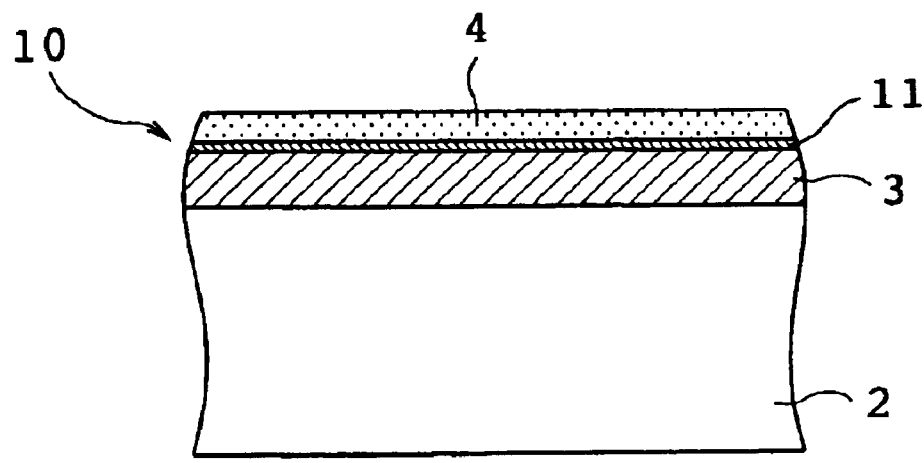
FIG. 2 is a sectional view of a sliding bearing of each of seventh to twelfth examples in accordance with the present invention.

FIG. 1 shows a sliding bearing of each of examples 1 to 6 of the invention. FIG. 2 shows a sliding bearing of each of examples 7 to 12 of the invention. In the figures, reference symbols 1 and 10 designate a sliding bearing. Reference symbol 2 designates a backing metal. Reference symbol 3 designates a bearing alloy layer. Reference symbol 4 designates a resin surface layer. Reference symbol 11 designates a bonding layer.

The frictional wear test, seizure test and cavitation test were conducted regarding the examples provided with the respective resin surface layers of the embodiment and comparative examples provided with the respective conventional resin surface layers. FIGS. 3A and 3B show the results of the tests. The frictional wear test was carried out under test conditions as shown in TABLE 2 using a frictional wear tester of the thrust type, so that a coefficient of friction and an amount of wear were measured. The seizure test was carried out under test conditions as shown in TABLE 3 using the same frictional wear tester, so that while bearing surface pressure was being increased by 3 MPa at intervals of 30 minutes, the load at the seizure occurrence was measured. In this case, a seizure load referred to a surface pressure in the case where a temperature of bearing back exceeded 200° C. or electric current flowing in an electric motor driving a shaft took an abnormal value. The cavitation test was carried out under test conditions as shown in TABLE 4 using a tester utilizing ultrasonic waves, so that a decrease in the weight of the resin surface layer was measured and converted to a volumetric decrease.

TABLE 2

| Item | Frictional wear test conditions | Unit |
| --- | --- | --- |
| Sample size | Outer dia. 27.2 × inner dia. 22.0 × thickness 1.6 | mm |
| Peripheral speed | 0.5 | m/s |
| Surface pressure | 10 (constant) | MPa |
| Test time | 4 | Hr |
| Lubricant | SAE#30 | — |
| Lubricant temperature | Room temperature | — |
| Lubricating method | Oil bath | — |
| Shaft material | S55C | — |
| Roughness | 0.3 or less | Rmax µm |
| Hardness | 500 to 700 | Hv 10 |

TABLE 3

| Item | Seizure test conditions | Unit |
| --- | --- | --- |
| Sample size | Outer dia. 27.2 × inner dia. 22.0 × thickness 1.6 | Mm |
| Peripheral speed | 2 | m/s |
| Surface pressure | Accumulating 3 MPa At intervals of 30 min. | MPa — |
| Lubricant | SAE#30 | — |
| Lubricant temperature | 60 | ° C. |
| Lubricating method | Oil dropping | — |
| Shaft material | S55C | — |
| Roughness | 1.0 | Rmax µm |
| Hardness | 500 to 700 | Hv 10 |

TABLE 4

| Item | Cavitation test conditions | Unit |
| --- | --- | --- |
| Sample size | 50 × 50 | mm |
| Ultrasonic oscillator | | |
| 1. Oscillation frequency | 19000 | Hz |
| 2. Output | 600 | W |
| 3. Lubricant | Water | — |
| 4. Lubricant temperature | Room temperature | — |
| 5. Clearance | 0.5 | mm |
| 6. Horn diameter | 20 | mm |
| 7. Test time | 3 | min. |

Numeric values in the composition of bearing are representative of volume percentage. Firstly, the bearing compositions in which the resin surface layer comprises only the base resin (comparative examples 13, 14 and 21) particularly have lower seizure loads as compared with the other bearing compositions in each of which the resin surface layer comprises the solid lubricant as well as the base resin. Furthermore, when compared with the comparative examples 15 to 20, the examples 2 to 6 differ from the comparative examples only in the base resin of the resin surface layer. More specifically, the base resin contains the PBI resin in each of examples 2 to 6, whereas the base resin contains the PAI resin in each of the comparative examples 15 to 20. PAI is one of thermosetting resins. The friction coefficients of the examples 2 to 6 are approximate to those of the comparative examples 15 to 20. However, the examples 2 to 6 are superior in an wear amount, seizure load and anti-cavitation property to the comparative examples 15 to 20. The reason for this is that the PBI resin has a higher heat resistance and material strength than the PAI resin, whereupon occurrence of erosion is limited.

In comparison between the examples 2 and 7, the friction coefficient, wear amount and seizure load of the example 2 are approximate to those of the example 7. However, the volumetric decrease of the example 2 is 3.46 mm$^3$, whereas that of the example 7 is 2.74 mm$^3$. Thus, the example 7 is superior to the example 2 in the volumetric decrease. When the volumetric decrease is small, the resin surface layer is hard to peel from the bearing alloy layer. In other words, the bonding layer provided between the bearing alloy layer and the resin surface layer can improve the bond strength of the resin surface layer against the bearing alloy layer. The same results as described above can be obtained from the comparison of the examples 3 and 6 with the respective examples 8 and 9.

Regarding the examples 10 to 12, the bonding layer also contains the solid lubricant. As a result, the seizure load is large in each example. Accordingly, since the effect of the solid lubricant can be expected in the bonding layer as in the resin surface layer, a sudden decrease in the sliding characteristic can be prevented even when the resin surface layer has been worn out.

The method of roughening the surface of the bearing alloy layer should not be limited to the blasting. Etching, metallizing or chemical treatment (chemical conversion treatment) may be employed as the roughening method, instead. Furthermore, the method of applying the resin surface layer and bonding layer should not be limited to the above-described air spraying. Pad printing or screen printing may be employed, instead.

The bearing alloy layer may comprise an aluminum alloy. Furthermore, the sliding bearing may or may not comprise the backing metal.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:
1. A sliding bearing comprising:
   a bearing alloy layer having a sliding surface;
   a bonding layer comprising a thermosetting resin and further comprising one or more of polyamide-imide, epoxy resin and phenol resin, and provided on the sliding surface of the bearing alloy layer; and
   a resin surface layer provided on the bonding layer and containing 20 to 95% by volume of polybenzimidazole as a base resin, and 5 to 80% by volume of a solid lubricant, the bonding layer being provided for improving a bonding strength between the bearing alloy layer and the resin surface layer.

2. A sliding bearing according to claim 1, wherein the resin surface layer further contains not more than 5% by volume of hard particles comprising one or more of a nitride, an oxide and a carbide, and not more than 10% by volume of a soft metal comprising one or more of copper, silver, gold, aluminum, tin, zinc or alloys thereof.

3. A sliding bearing according to claim 1, wherein the bonding layer contains a solid lubricant.

4. A sliding bearing according to claim 2, wherein the bonding layer contains a solid lubricant.

5. A sliding bearing according to claim 1, wherein the bearing alloy layer comprises a copper alloy or an aluminum alloy.

6. A sliding bearing according to claim 2, wherein the bearing alloy layer comprises a copper alloy or an aluminum alloy.

7. A sliding bearing according to claim 3, wherein the bearing alloy layer comprises a copper alloy or an aluminum alloy.

8. A sliding bearing according to claim 4, wherein the bearing alloy layer comprises a copper alloy or an aluminum alloy.

9. The sliding bearing of claim 1 further comprising a backing metal plate to which said bearing alloy is bonded, said sliding bearing comprising a part of an internal combustion engine.

* * * * *